Feb. 5, 1929.
W. G. KRECSY
1,700,802
SIGNALING DEVICE FOR VEHICLES
Filed May 23, 1927
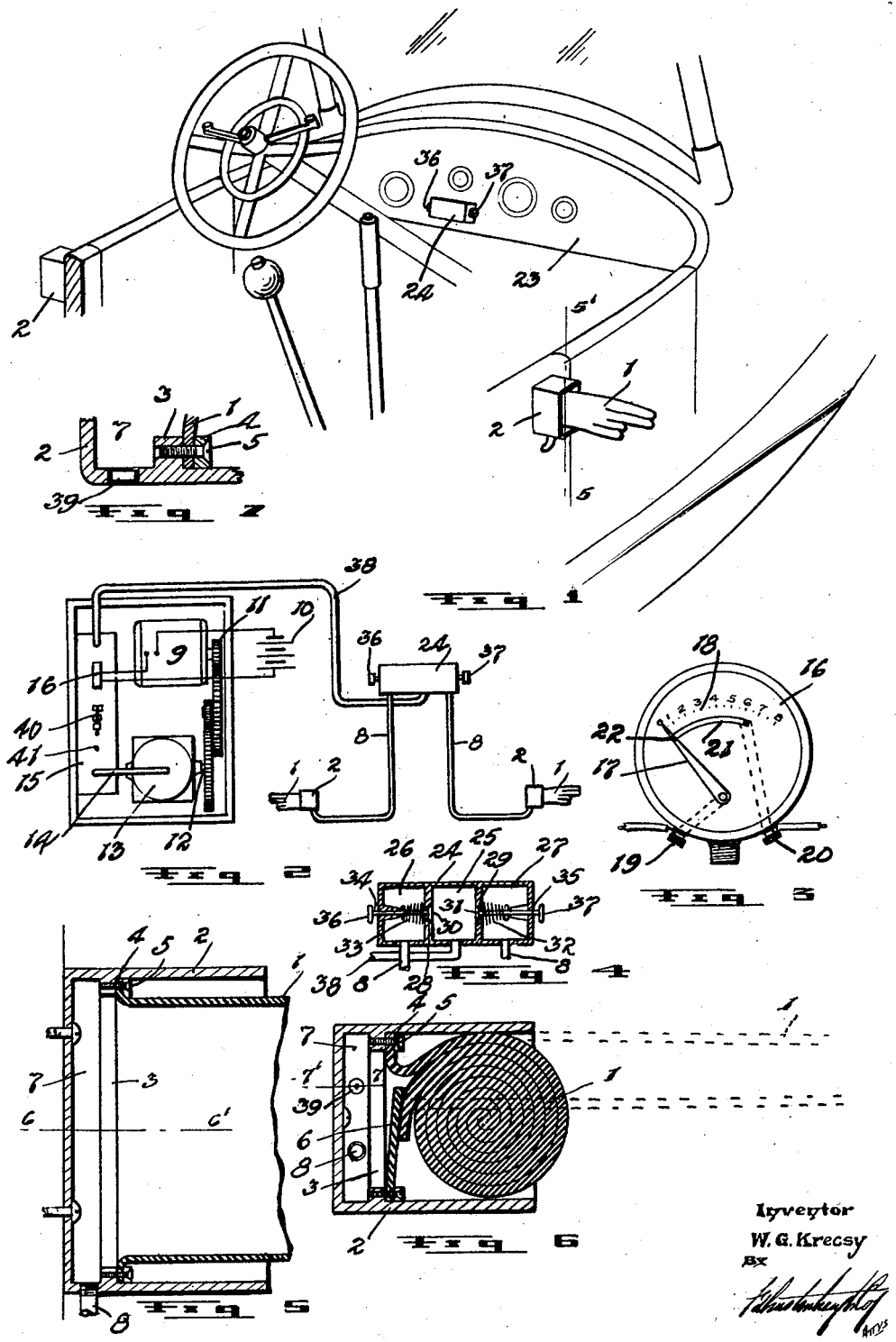
Inventor
W. G. Krecsy Patented Feb. 5, 1929.

1,700,802

UNITED STATES PATENT OFFICE.

WILLIAM G. KRECSY, OF KIPLING, SASKATCHEWAN, CANADA.

SIGNALING DEVICE FOR VEHICLES.

Application filed May 23, 1927. Serial No. 193,571.

The invention relates to improvements in signaling devices for vehicles and particularly to an indicator appliance which will visibly show to a following vehicle the direction of turn and an object of the invention is to provide a vehicle with a pair of normally deflated and non-visible signals located at opposite sides of the vehicle and which can be selectively inflated by the driver to extend the indicator so that it can be clearly seen to indicate the direction of turn.

A further object is to provide an indicator which upon being deflated will automatically curl up and take a non-visible position.

A still further object of the invention is to associate with the indicator an audible alarm such as a whistle which will make a shrill noise during the time that the indicator is working and which acts also as a relief valve to exhaust the air from the indicator and permit it to curl up.

With the above more important and other minor objects in view which will become more apparent as the description proceeds, the invention consists essentially in the arrangement and construction of parts hereinafter more particularly described, reference being had to the accompanying drawing, in which—

Fig. 1 is a perspective view of a portion of an automobile and showing my indicators thereon, one of which is inflated.

Fig. 2 is a view showing the device diagrammatically.

Fig. 3 is an enlarged detailed face view of the pressure gauge employed.

Fig. 4 is a vertical sectional view longitudinally and centrally through the control box.

Fig. 5 is an enlarged detailed vertical sectional view at 5—5' Figure 1.

Fig. 6 is a horizontal sectional view at 6—6' Figure 5.

Fig. 7 is an enlarged detailed vertical sectional view at 7—7' Figure 6.

In the drawing like characters of reference indicate corresponding parts in the several figures.

In equipping a vehicle such as an automobile with my appliance, I provide an indicator at either side of the vehicle, the indicators being identically constructed and located in a convenient place such that when they are extended they can be clearly seen.

The indicator, in each instance, is made in the form of an air bag and is flexible and is herein shaped so that when inflated, it will simulate a pointing hand. The sides of the bag are made so that one side is in tension, such resulting in the bag having a natural tendency to roll or curl up when deflated. I may say that self curling bags of this nature are commonly used as favors and as their arrangement is well known, I have not considered it necessary to give a detailed description thereof.

The curled up or coiled bag is adapted to take a non-conspicuous position in a substantially rectangular stationary receiving box 2 suitably fastened say to the side of the automobile. The box is provided with an internal continuous flange or seat 3 and the open end of the bag is fastened to the seat by applied strips 4 secured by screws 5 to the seat. A strip 6 of comparatively stiff rubber is associated with the inner end of the bag, this being also caught in the strip and acting to take considerable strain off the bag when the same is deflated and to aid in coiling the same. The inner end of the box provides an air chamber 7 and an inflating pipe 8 leads to the chamber.

It will be accordingly apparent that should air under pressure be passed through the tube into the chamber, the same will act to inflate the indicator and the pressure of the air will extend the indicator and hold it in an outstanding position as best shown in Figure 1 where it will visibly indicate to a following driver the direction of turn. As there is a signal at either side, the direction of turn can be readily indicated by inflating one or other of the indicators.

I have provided a driven air pump for supplying the air to inflate the bags and have also provided a control box by the manipulation of which the driver can selectively inflate either indicator. These parts are shown diagrammatically in Figure 2 and are now described.

A comparatively small motor 9 is provided, the motor being connected by lead wires to a battery 10. The motor shaft is fitted with a pinion 11 and the pinion drives, through a train of gears provided, the drive shaft 12 of an air pump 13. A pipe 14 passes from the pump to a pressure tank 15, the pump acting to pump and store air in the tank. A pressure gauge 16 is provided, the pressure gauge being connected to the tank and having a pointer 17 which indicates the pressure, the pointer operating over a scale 18 provided on the gauge. The manner in which the pointer is operated is not described as the action of pressure gauges is well known. It suffices to say that the pointer indicates on the scale the pressure of the air in the tank.

The pressure gauge is connected electrically in series with the battery and the pressure gauge is utilized as a switch to automatically control the current flowing from the battery to the motor, the arrangement being such that when the air pressure in the tank has reached a predetermined pressure, the gauge will automatically operate to stop the motor by breaking the electrical connection between the battery and the motor.

It will be observed in Figure 3, that the pressure gauge is provided with two terminals 19 and 20. One of these terminals 19 is connected electrically to the pointer and one of the lead wires from the battery is connected to this terminal. The other of the terminals 20 is connected electrically to a bar 21 on the face of the gauge which is adapted to be slidably engaged by a pin 22 carried by the pointer 17. The terminal 20 is connected electrically to the other of the terminals of the battery. In Figure 3 of the drawing, one end of the bar 21 is opposite the zero reading of the scale whilst the other end is approximately equal to the reading six and a half of the scale.

According to this arrangement, the motor will be in circuit with the battery for any reading of the gauge between zero and six and a half pounds pressure. Should the pressure, however, in the tank and as indicated by the gauge exceed six and a half pounds, the pointer 17 will pass off the right hand end of the bar and will break the circuit between the battery and the motor and the circuit will remain broken as long as the high pressure is maintained in the tank. Obviously the pointer operating on the bar acts as a switch controlling the motor, the motor automatically stopping when the pressure is excessive.

In a suitable location on the automobile such as on the dash board 23, I locate a substantially rectangular control box 24 which is interiorly divided by cross partitions into a central chamber 25 and two end chambers 26 and 27. The partitions are provided with valve seats 28 and 29 and the valve seats are normally engaged by valves 30 and 31 held seated by springs 32 and 33 within the chambers 26 and 27. The valves are provided with stems 34 and 35 which extend slidably through the end of the box and are provided with finger pieces or heads 36 and 37. The arrangement of the control box is such that one can unseat either valve by impressing the finger piece of that valve.

A pipe 38 leads from the tank to the central chamber 25 of the control box and one of the pipes 8 hereinbefore mentioned leads from the chamber 7 of one of the indicator boxes to the chamber 27 whilst the other of the chambers 7 leads through a similar pipe 8 to the chamber 26. By the structure provided, the pressure in the tank will always be maintained at a predetermined pressure, the motor starting and stopping depending on the pressure of the tank.

When the driver desires to indicate say a turn to the right, he will press in the right hand button 37 and this will permit the air from the tank to pass through the pipe 38 into the chamber 27 and then through the pipe 8 to the right hand indicator 1 which will be inflated and extended to indicate the direction of turn. Conversely if it is desired to turn to the left, the button 36 will be pressed and the left hand indicator will be inflated.

It is necessary to permit the air to escape from the indicators after they have been inflated so that they will be free to automatically curl up and take their not in use, nonconspicuous position within the box. This is provided for in the following manner.

Each of the chambers 7 is provided in one of the side walls with a whistle 39 of the well known type and this whistle serves not only to exhaust the air from the indicator but also operates to give an audible alarm the time the indicator is inflated. Here it will be understood that the air pressure in the tank will be sufficient to fully inflate the indicator, whilst a certain amount of air is escaping through the whistle 39 and creating an audible alarm.

It will be observed that the air will be passing to the indicator only so long as the valve in the control box is held depressed. After the valve is released and it seats, the air in the chamber 7 and in the inflated indicator will be exhausted through the whistle, such permitting the indicator to curl up as required.

I have provided the tank with a safety valve indicated at 40 which will blow off when a predetermined pressure is reached, such being provided in event the indicator 17 fails to operate. The tank is provided also with a check valve 41 so that one can take a direct reading of the air pressure of the tank by utilizing the air gauge.

Whilst I have shown the inflatable indicator as in the shape of a hand, it will be readily understood I do not desire to be limited to this precise form as any selected shape could be adapted as experience dictates. The inflatable signals can be readily removed by undoing the screws 5. In this way, it is an easy matter to replace a worn out and damaged signal as occasion demands.

What I claim as my invention is:—

1. A signaling device for a vehicle comprising a self coiling inflatable indicator located at either side of the vehicle and normally deflated and coiled to render the same inconspicuous, a control box having a central and two end chambers therein, manually operated, normally seated, valves selectively controlling the passage of air from the central chamber to the outer chambers, a source of compressed air supply connected to the central chamber, air pipes leading from the end chambers to the inflatable indicators whereby in the depression of one or other of the valves, one or other of the indicators will be inflated to indicate the direction of turn and means for exhausting the air from the inflated indicator after the signal has been given to permit the same to coil up.

2. A signaling device for a vehicle comprising a self coiling inflatable indicator located at either side of the vehicle and normally deflated and coiled to render the same inconspicuous, a control box having a central and two end chambers therein, manually operated normally seated valves selectively controlling the passage of air from the central chamber to the outer chambers, a source of compressed air supply connected to the central chamber, air pipes leading from the end chambers to the inflatable indicators whereby in the depression of one or other of the valves, one or other of the indicators can be inflated to indicate the direction of turn and a whistle associated with each indicator and adapted to create an audible alarm during the interval that the indicator is inflated and to exhaust the air from the indicator upon the valve controlling the passage of air to that indicator being closed.

Signed at Winnipeg this 14th day of April, 1927.

WILLIAM G. KRECSY.